(12) United States Patent
Huang et al.

(10) Patent No.: US 8,179,925 B2
(45) Date of Patent: May 15, 2012

(54) SINK DEVICE FOR A WIRELESS LOCAL AREA NETWORK

(75) Inventors: Chen-Chih Huang, Hsin Chu County (TW); Jia-Ching Shen, Tai Pei (TW)

(73) Assignee: Realtek Semiconductor Corp., Hsinchu (TW)

( * ) Notice: Subject to any disclaimer, the term of this patent is extended or adjusted under 35 U.S.C. 154(b) by 812 days.

(21) Appl. No.: 12/168,546

(22) Filed: Jul. 7, 2008

(65) Prior Publication Data

US 2009/0010192 A1 Jan. 8, 2009

(30) Foreign Application Priority Data

Jul. 4, 2007 (TW) .............................. 96124371 A

(51) Int. Cl.
*H04J 3/06* (2006.01)
(52) U.S. Cl. ...................................................... 370/512

(58) Field of Classification Search .................. 455/130, 455/230, 255, 257, 265
See application file for complete search history.

(56) References Cited

U.S. PATENT DOCUMENTS

| | | | |
|---|---|---|---|
| 2003/0177154 A1* | 9/2003 | Vrancic | 708/160 |
| 2006/0062195 A1* | 3/2006 | Gervais et al. | 370/345 |
| 2007/0091934 A1* | 4/2007 | Myles et al. | 370/503 |
| 2008/0049633 A1* | 2/2008 | Edwards et al. | 370/252 |

\* cited by examiner

*Primary Examiner* — Chi Pham
*Assistant Examiner* — Fan Ng
(74) *Attorney, Agent, or Firm* — Thomas, Kayden, Horstemeyer & Risley, LLP

(57) ABSTRACT

The invention discloses a sink device and a signal receiving method thereof, applicable to wireless local area network. The sink device receives a plurality of beacon signals, synchronizes the beacon output signal generated by itself with the operating clock of the source device according to the above-mentioned timing synchronization data. And the sink device receives the plurality of beacon signals according to this calibrated synchronization clock.

20 Claims, 5 Drawing Sheets

SINK DEVICE FOR A WIRELESS LOCAL AREA NETWORK

BACKGROUND OF THE INVENTION (a) Field of the Invention

The invention relates to local area network technology, particularly to wireless local area network technology.

(b) Description of the Related Art

In general, in the application of a wireless local area network (WLAN), in order to reduce power consumption, the wireless station (STA) will enter a power-saving mode during the time interval without actual signal transmitting or receiving and return to a normal mode within a pre-determined period to receive the signal from the access point (AP). If there is no data transmitting or receiving requested by the access point, then the STA enters the power-saving mode again until the next period.

In the normal mode, the STA performs receiving or transmitting function with a high frequency clock (usually in MHz range); and in the power-saving mode, in order to reduce power consumption, the wireless station usually operates with a low frequency clock (usually in KHz range). Although the frequency of the low frequency clock is low, accuracy is still required. If the normal mode is initiated too early, power consumption will increase. If the normal mode is initiated too late, the signal from the WLAN AP will be missed to result in connection failure. In general, in order to keep the accuracy of the low frequency clock of the power-saving mode, the STA needs to utilize an external oscillator for supplying a stable and accurate clock signal to the STA, such as a 32.768 KHz clock signal. The external oscillator is independent on the environment factors, such as manufacturing process, operational voltage, temperature, and so forth. However, such the external oscillator will increase production cost.

BRIEF SUMMARY OF THE INVENTION

One object of the invention is to provide a sink device and a method thereof applicable to a wireless local area network to achieve accurate receiving and transmitting functions without externally coupling to an external oscillator.

One object of the invention is to provide a sink device and a method thereof applicable to a wireless local area network to achieve more power-saving function.

One object of the invention is to provide a sink device and a method thereof applicable to a wireless local area network to achieve reduction of the number of pins which is used to receive the output of the external oscillator.

One embodiment according to the invention provides an apparatus applicable to a wireless local area network. The apparatus receives a first beacon signal and a second beacon signal from a source device. The first beacon signal comprises a first time stamp and the second beacon signal comprises a second time stamp. The apparatus comprises a receiving circuit, a computing circuit, and an adjusting circuit. The receiving circuit configures to enter a normal mode or a power-saving mode according to a beacon output signal and to receive the first beacon signal and the second beacon signal when the receiving circuit operates in the normal mode. The computing circuit couples to the receiving circuit and is used to compute a time interval between the first beacon signal and the second beacon signal to obtain a first value. The computing circuit also computes a difference between the first time stamp and the second time stamp to obtain a second value. The adjusting circuit couples to the computing circuit and adjusts the beacon output signal according to the first and the second values. The apparatus substantially synchronizes with the source device according to the beacon output signal.

One embodiment according to the invention provides a signal receiving method. The signal receiving method is applicable to a wireless local area network and the wireless local area network comprises a sink device and a source device. The method comprises following steps: receiving a first beacon signal and a second beacon signal from the source device, wherein the first beacon signal comprises a first time stamp and the second beacon signal comprises a second time stamp; computing the time interval between the first and second beacon signals to obtain a first value; computing a difference between the first and second time stamps to obtain a second value; and adjusting a beacon output signal according to the first and the second values. Please note that, in one embodiment, the sink device synchronizes with the source device according to the beacon output signal. In another embodiment, the sink device enters a normal mode or a power-saving mode according to the beacon output signal. In another embodiment, the above-mentioned method operates during a power-saving mode of the sink device of a wireless local area network. In another embodiment, the beacon output signal is generated during the power-saving mode. In another embodiment, the step of obtain the first value comprises: generating a clock signal, wherein the clock signal is influenced by at least one environment factor; and using the clock signal to count the time interval between the first and the second beacon signals to obtain the first value. In another embodiment, the above-mentioned method further comprises: counting a reference clock signal to generate a third value in a calibrating mode; and calibrating the clock signal according to the third value in the calibrating mode. In another embodiment, the step of adjusting the beacon output signal comprises: generating a parameter according to the first and the second values; comparing the parameter with a target beacon interval value to generate a comparison result; and adjusting the beacon output signal according to the comparison result. In another embodiment, the step of adjusting the beacon output signal comprises: performing a mathematical algorithm to determine an adjustment amount according to the first and the second values; and adjusting the beacon output signal according to the adjustment amount.

DETAILED DESCRIPTION OF THE INVENTION

In the following, detail descriptions of the WLAN apparatus according to embodiments of the invention will be given with reference to the drawings and the same symbol will be used for the same device.

It should be noted that the apparatus according to an embodiment of the invention is applicable to various wireless local area networks, such as applicable to infrastructure wireless LAN according to the current specification or Ad Hoc wireless LAN. Of course, it can be understand for those who are skilled in the art that the apparatus of one embodiment of the invention is also applicable to various wireless local area network specifications and structures currently available or others to be developed in future without deviating from what is claimed for the invention.

Figure 1A:
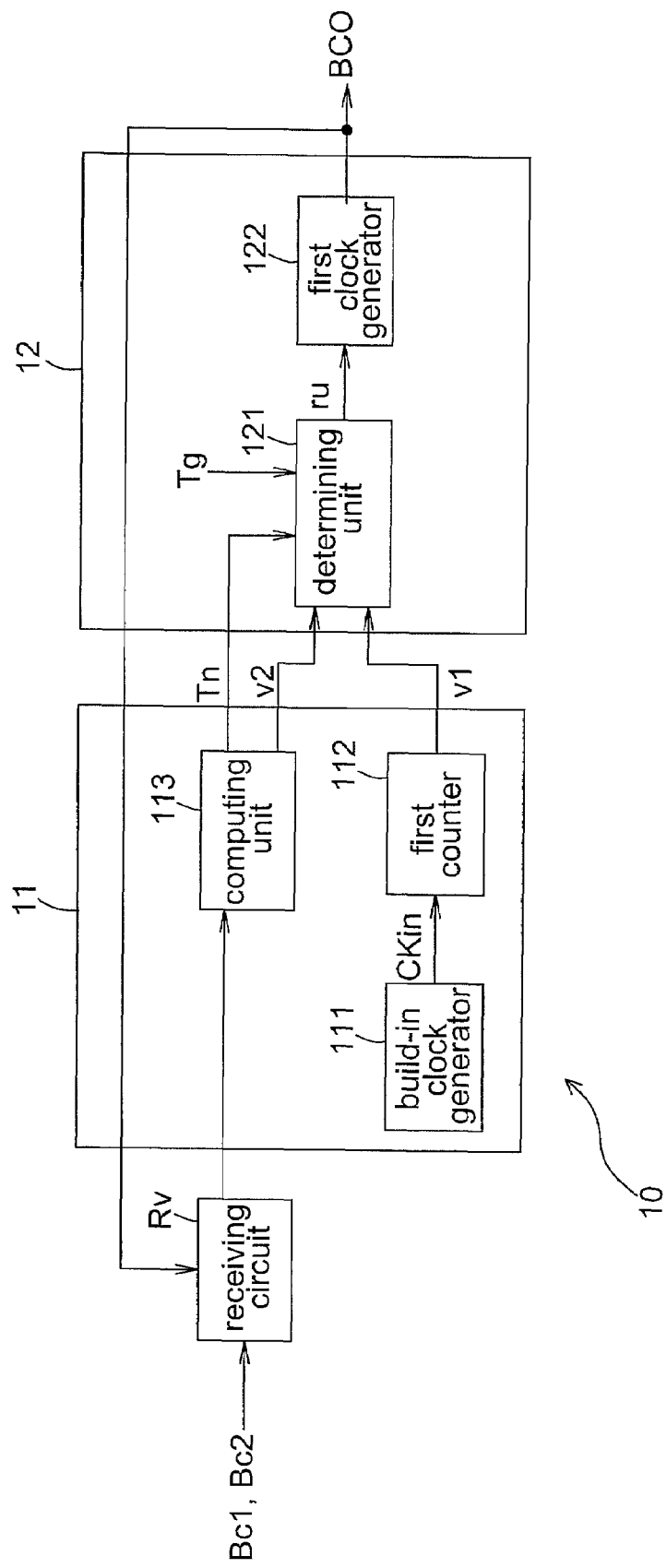
FIG. 1A shows a schematic diagram illustrating the sink device according to one embodiment of the invention.

FIG. 1A shows a schematic diagram illustrating an sink device 10 according to one embodiment of the invention. In one embodiment of the invention, the sink device 10 may be a sink device or a wireless station (STA). The sink device 10 receives a plurality of beacon signals (Bc) transmitted by a source device (such as access point (AP)). Each of the beacon signals contains information which indicates the time data of the source device. For instance, the first beacon signal Bc1 comprises the time data field having a first time stamp and the second beacon signal Bc2 comprises the time data field having a second time stamp. For example, in the IEEE 802.11 specification, the time stamp is eight-byte data for recording the time value of the timing synchronization function timer (TSF TIMER) of the source device. The value is a reference for the synchronizing operation among various STA. Of course, the technology of one embodiment of the invention is not limited to the IEEE 802.11 specification, but the invention is applicable to the applications where the source device provides the time data of its operation to the apparatus. Similarly, the time data provided by the source device is not limit to the time stamp according to the embodiment of the invention.

The sink device 10 according to the embodiment of the invention can operate in a normal mode and in a power-saving mode (sleep mode). The following description is focused on the operating method of the sink device 10 in the power-saving mode. Therefore, only the circuits relevant to the power-saving mode are illustrated in the drawings and the circuits required in the normal mode are not shown. After reading the circuits and the description of the embodiments of the invention, those who are skilled in the art should be able to implement the complete receiving circuit comprising the power-saving mode and the normal mode according to the technology disclosed by the invention.

Referring to FIG. 1A, the sink device 10 according to one embodiment of the invention comprises a receiving circuit Rv, a computing circuit 11, and an timing adjusting circuit 12.

The receiving circuit Rv configures to enter a normal mode or a power-saving mode according to a beacon output signal BCO and receives the first beacon signal Bc1 and the second beacon signal Bc2 when the receiving circuit Rv operates in the normal mode.

The computing circuit 11 couples to the receiving circuit Rv and uses a low-frequency clock signal to compute a time interval between receiving the first beacon signal Bc1 and the second beacon signal Bc2 to obtain a first value v1. At the same time, the computing circuit 11 also computes the difference between the first time stamp of the first beacon signal Bc1 and the second time stamp of the second beacon signal Bc2, respectively, to obtain a second value v2. In one embodiment, the computing circuit 11 comprises a build-in clock generator 111 for generating the low-frequency clock signal CKin, a first counter 112, and a computing unit 113. Wherein, the clock signal CKin is influenced by at least one environment factor.

The build-in clock generator 111 can be various types of oscillating circuit and is used to generate a low-frequency clock signal CKin, such as a 32.768 KHZ clock signal. The first counter 112 uses the clock signal CKin to count the time interval between the first and the second beacon signals Bc1, Bc2 to obtain the above-mentioned first value v1. For example, when the first beacon signal Bc1 arrives at the receiver Rv, the first counter 112 starts to count the clock signals Ckin and stops counting until the second beacon signal Bc2 is subsequently inputted. Then, the first counter 112 obtains a first value v1 on the basis of the number of stopping counting the clock signals Ckin. The computing unit 113 computes the difference between the first time stamp in the field of the first beacon signal Bc1 and the second time stamp in the field of the second beacon signal Bc2 to obtain the above-mentioned second value v2. In another embodiment, the computing unit 113 can also additionally generate a fine adjustment signal Tn between the first and the second beacon signals Bc1 and Bc2 for assisting the timing adjusting circuit 12 to fine adjust the beacon output signal BCO. The fine adjustment signal Tn comprises the various fine adjustment information generated by the computing unit 113 while the computing unit 113 monitors the system during the interval between the first and the second beacon signals Bc1 and Bc2. For example, when the sink device 10 is in normal mode, the fine adjustment information comprises the time of the sink device 10, temperature, operational voltage, and so forth.

The timing adjusting circuit 12 couples to the computing circuit 11 and adjusts the beacon output signal BCO, generated by the timing adjusting circuit 12, according to the first and the second values v1 and v2. Then, the timing adjusting circuit 12 outputs the beacon output signal BCO to the receiver Rv. The receiver Rv determines whether the mode of the sink device 10 is either the power-saving mode or the normal mode according to the beacon output signal BCO. Thus, the sink device 10 substantially synchronizes with the source device according to the beacon output signal BCO. It should be noted that, in one embodiment of the invention, the timing adjusting circuit 12 adjusts the beacon output signal BCO to be faster or slower according to the first and the second values v1 and v2. Of course, the timing adjusting circuit 12 may also additionally fine adjust the accuracy of the beacon output signal BCO according to the above-mentioned fine adjustment signal Tn. In one embodiment of the invention, the timing adjusting circuit 12 comprises a determining unit 121 and a clock generator 122. The determining unit 121 generates a parameter ref (not shown in the figure) according to the first value v1 and the second value v2 and compares the parameter ref with a pre-determined target beacon interval value Tg to generate a comparison result ru. It should be noted that, in another embodiment of the invention, the determining unit 121 can generate the parameter ref (not shown in the figure) according to the first value v1, the second value v2 and the fine adjustment signal Tn, simultaneously. The clock generator 122 receives the comparison result ru and adjusts the beacon output signal BCO generated by itself according to the comparison result ru. The target beacon interval value Tg is the period length that the sink device 10 wakes up from the power-saving mode to the general mode.

Figure 1B:
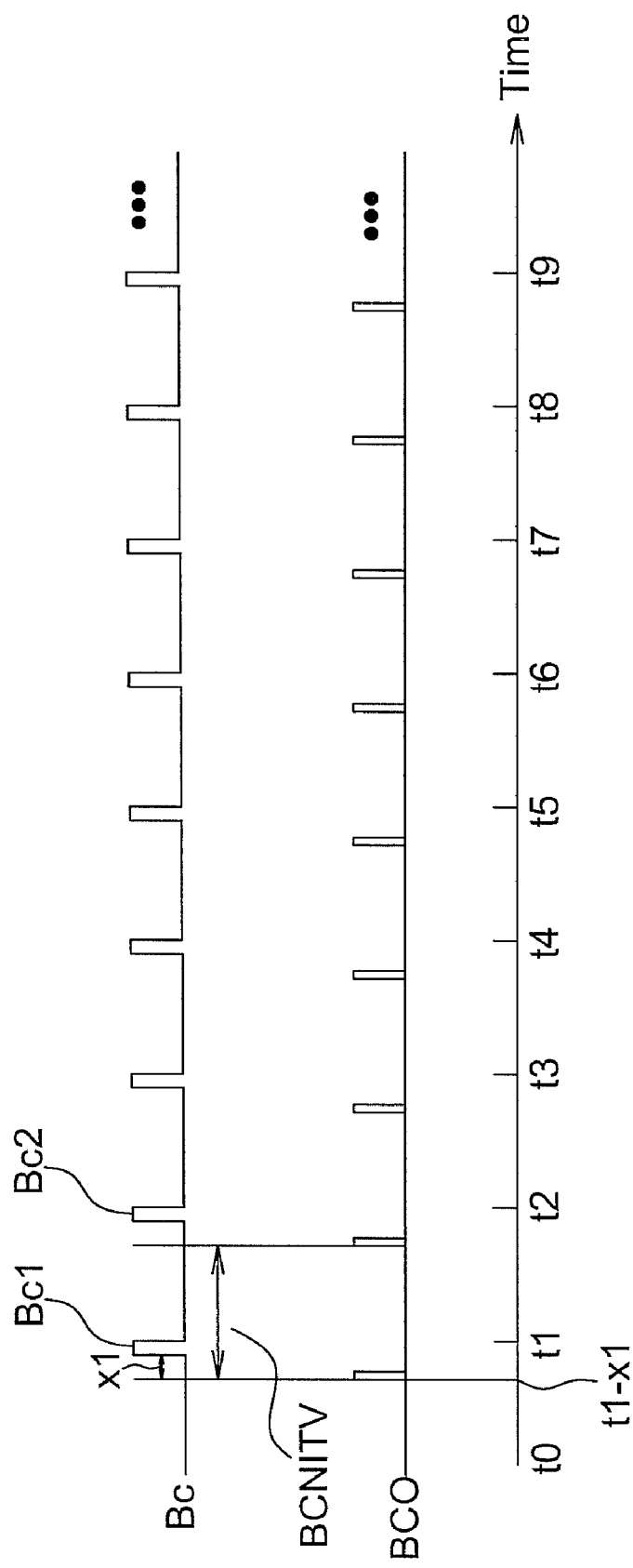
FIG. 1B illustrates an operating waveform chart of the sink device according to one embodiment of the invention.

It should be noted that thereafter the sink device 10 will communicate with the source device according to the beacon output signal BCO, that is, the sink device 10 will synchronize with the source device according to the beacon output signal BCO. For example, as shown in FIG. 1B, the enabling time of each beacon output signal BCO is set to be earlier than the beacon signal by a pre-determined time x1. Therefore, the sink device 10 wakes up when the beacon output signal BCO is enabled (at the timing point t1-x1) and enters the normal mode in advance, so that the sink device 10 can accurately receive the beacon signal Bc at the timing point t1. After receiving the beacon signal Bc, the sink device 10 performs data transmission according to the message frame data of the beacon signal Bc, enters the power-saving mode again after completing the data transmission, and wakes up to prepare for receiving the next beacon signal until next time the beacon output signal BCO is enabled. Or, if the message frame data indicates that no activity is required, the sink device 10 enters the power-saving mode within the designated time according to the communication protocol and wakes up until the next time the beacon output signal BCO is enabled.

In one embodiment of the invention, the sink device 10 can also overcome the unstable frequency problem of the build-in clock generator 111 caused by the environment factor, such as manufacturing process, operational voltage, temperature, and so forth. The detail description of the operation will be given in the followings.

At first, it is assumed that the pre-determined target beacon interval value Tg is 400 ms, that is, the pre-determined length of BCNITV in FIG. 1B is 400 ms, and it is assumed that the frequency of the build-in clock generator 111 is 32.768 KHZ. The first time stamp of the first beacon signal Bc1 is recorded to be 1200 ms and the second time stamp of the second beacon signal Bc2 is recorded to be 1602 ms. Then, the computing unit 113 can derive the second value v2=402 ms, indicating the time interval between the two beacon signals Bc1 and Bc2. At the same time, the first counter 112 can count up to 32 counts every millisecond (ms). Therefore, in the interval between receiving the first beacon signal Bc1 and receiving the second beacon signal Bc2, a total of v1=402×32=12864 counts can be counted.

Then, the determining unit 121 receives the first and the second values v1 and v2 and at the same time derives the actual beacon interval value BCNITV according to the pre-determined target beacon interval value Tg. The arithmetical operation equation of the determining unit 121 is given by the following:

$$BCNITV = (\Delta u32 / \Delta Rx\_BCN\_TSF) \times Tg \quad (1)$$

where BCNITV is the actual beacon interval value; $\Delta u32$ is the number of counts derived from counting the frequency of the 32.768 KHZ build-in clock generator 111 by the first counter 112 between the two beacon signals Bc1 and Bc2 ($\Delta u32$ is the v1); $\Delta Rx\_BCN\_TSF$ is the difference derived by subtraction between the time stamps of the two beacon signals Bc1 and Bc2 ($\Delta Rx\_BCN\_TSF$ is the v2); and Tg is the pre-determined target beacon interval value 400 ms.

By substituting the above-mentioned values into equation (1), then:

$$BCNITV = ((402 \times 32)/(1602-1200)) \times 400 = 12800.$$

Finally, the determining unit 121 generates a comparison result signal ru according to the actual beacon interval value of 12800 for the clock generator 122. As can be seen from the values of the equation in this embodiment of the invention, the operating period of the source device is equal to the period of the build-in clock generator 111 of the sink device 10 and both are 402 ms. It means that the beacon output signal BCO of the sink device 10 synchronizes with the source device.

Besides, assuming that the build-in clock generator 111 is under the influence of environment factors (manufacturing process, temperature, voltage and so forth) and/or the channel is occupied so that the source device transmits the second beacon signal Bc at 2007 ms, the beacon signal Bc2 is now received via the receiving circuit Rv and the first counter 112 counts the number of the clock signals Ckin of the build-in clock generating 111 during the interval between the beacon signals Bc1 and Bc2. Since the first counter 112 can count up to 32 counts every millisecond, it can be assumed that the first value v1=815×32=26080 counts can be derived from counting by the first counter 112, and the second value v2=2007−1200=807 ms can be derived after the computing unit 113 computes the interval between the first time stamp 1200 and the second time stamp 2007. Then, substituting these values in the equation (1), the actual beacon interval value BCNITV=((815×32)/(2007−1200))×400=12926.88 can be derived. Because of data variation of the two above-mentioned actual beacon interval values BCNITV (varying from 12800 to 12926.88), the build-in clock generator 111 is considered to be influenced by the environment factors. Therefore, the sink device 10 can correspondingly adjust the beacon output signal BCO of the first clock generator 122 to be faster or slower according to the degree of data variation (which can be considered as the influence of the environment factors). Thus, the beacon output signal BCO can still align with the operating clock (TSF time) of the source device so that the sink device 10 can wake up at the proper timing to receive the beacon signal Bc correctly.

It should be noted that, although the timing that the source device transmits the beacon signal Bc can be delayed because the source device considered that the channel is occupied by the other device, the signal transmission will be continued when the channel becomes available. As described in the above-mentioned embodiment of the invention, the beacon signal is transmitted by the source device until 2007 ms. Sometimes, the deviation of the interval between the two beacon signals Bc can be several hundreds microseconds. However, as stipulated in some relevant specifications (such as the IEEE 802.11): the source device attaches the counted value of the local counter to the field of the time stamp only when the source device can actually transmit the beacon signal, allowing all the sink devices connected to the source device being able to align with the time counted by the counter of the source device. Because the sink device according to one embodiment of the invention counts according to the time stamp, transmitting the beacon signal Bc faster or slower from the source device will not influence the operation of the sink device according to one embodiment of the invention.

In one preferred embodiment of the invention, the sink device 10 overcomes the various environment factors to generate an accurate beacon output signal BCO. The sink device 10 temporarily stores the first value v1 counted by the first counter 112. Then, the sink device 10 derives a plurality of count values $v1_1$, $v1_2$, $v1_3$, and $v1_n$ (n is a positive integer) according to the first value v1 counted by the first counter 112. Utilizing any mathematical algorithm like least mean square method (LMS), various linear regression methods, moving average value and other algorithms to analyze the n count values, an estimating value (an adjustment amount) can be derived by the timing adjusting circuit 12. Then, by adjusting the beacon output signal BCO according to the estimating value, the variations induced by the temperature and the voltage can be eliminated. For instance, the moving average value of the n count values is calculated, that is, the moving average value of the k count values is given by:

$$v1k = (v1_m + v1_{m+1} + v1_{m+2} + \ldots + v1_{m+k-1})/k \quad (2)$$

where m and k are positive integers. Of course, another embodiment of the invention may utilize the learning mechanism or the rule of thumb to determine the next first value v1 that will be influenced by the temperature or/and the voltage variation, to be used as reference for the first clock generator 122 to adjust the beacon output signal BCO to be faster or slower.

For different chips, the v1 or v1k derived from counting the time interval between the two beacon signals Bc or the moving average value of the plurality of beacon signals will be different due to process variation. However, since the v1 or v1$k$ is still synchronized with the frequency of source device, one embodiment of the invention can also overcome the influence by the manufacturing process.

In another embodiment of the invention, the sink device 10 also provides the following function. That is, when the beacon signal Bc cannot be correctly received temporarily because the signal transmitted by the source device is influenced by the change of the channel quality, the sink device 10 can automatically change the cumulative value v1$_m$ of the counting interval of the above-mentioned equation (2) and automatically adjust the k value into a suitable value to achieve the same automatic calibrating function.

Figure 2:
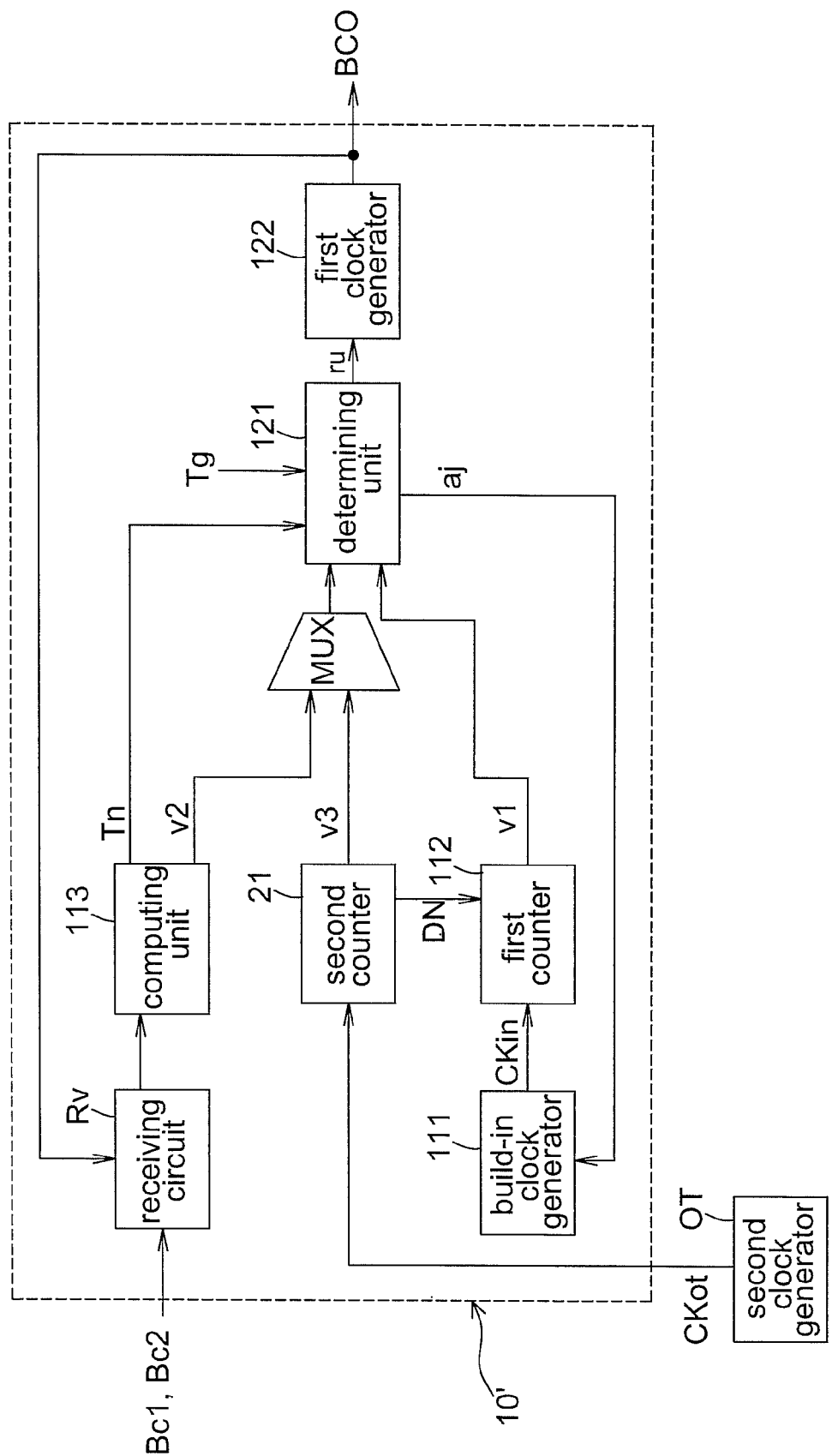
FIG. 2 shows a schematic diagram illustrating the sink device according to another embodiment of the invention.

Besides, FIG. 2 shows the sink device 10' according to another embodiment of the invention. The sink device 10' comprises a calibrating mode. The sink device 10' enters the calibrating mode when just initiating, after a fix period, or when being considered necessary (such as: the sink device 10' is unable to receive the beacon signal Bc many times continuously, which means that there may be a connection problem or the deviation of the source device timing synchronization becomes too large to be compensated). A second counter 21 and a multiplexer MUX are further added to the sink device 10' and an external second clock generator OT is also added to the sink device 10'. When entering such calibrating mode, the second counter 21 starts to count the reference clock signal CKot generated from the second clock generator OT and outputs the third value v3 derived from the counts to the multiplexer MUX. Then, the determining unit 121 learns and compensates the variation of the build-in clock generator 111 according to the first value v1 and the third value v3. There are many ways of compensating, such as: (1) generating an adjusting signal aj according to the first value v1 and the third value v3 to calibrate the build-in clock generator 111; and (2) adjusting the first clock generator 122 according to the first value v1 and the third value v3. In one embodiment of the invention, the second counter 21 is directly utilized to count and output the third value v3 to the determining unit 121, so that the determining unit 121 can directly calibrate the first clock generator 122 according to the third value v3 until the receiving circuit Rv receives the beacon signal Bc and thereafter the sink device 10' returns to the power saving mode.

Figure 3:
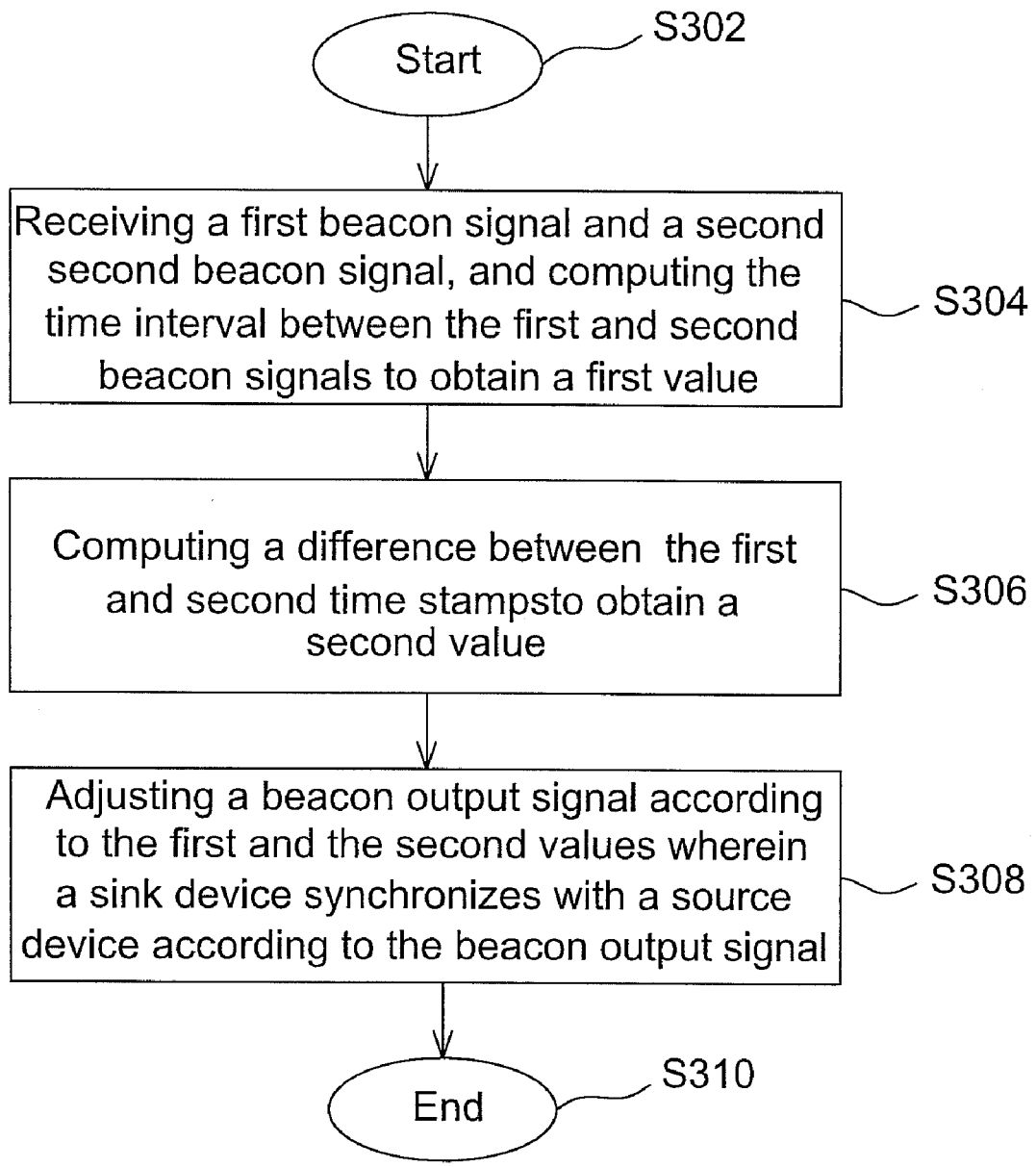
FIG. 3 shows a flow chart illustrating the signal receiving method according to one embodiment of the invention
Figure 4:
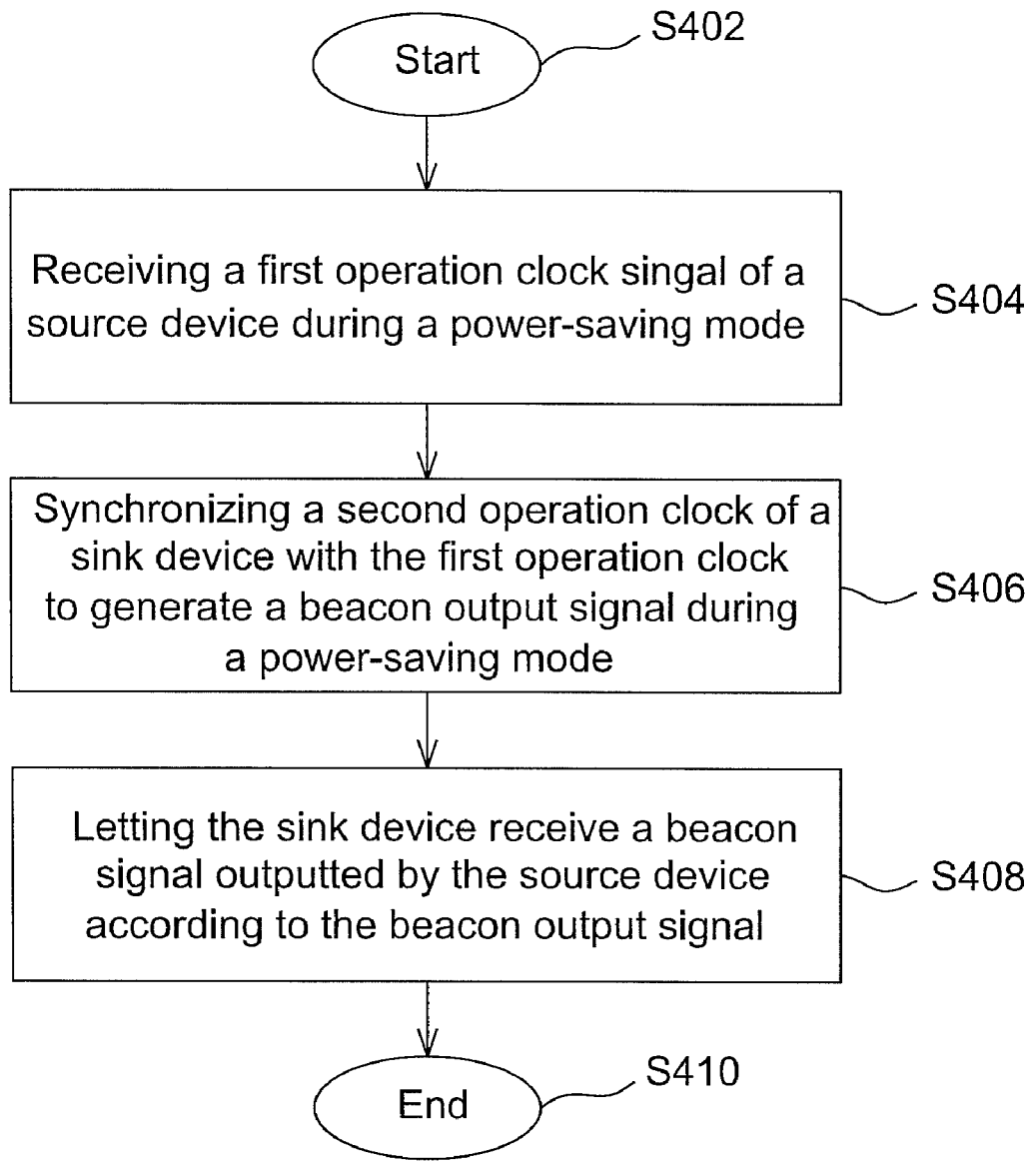
FIG. 4 shows a flow chart illustrating the signal receiving method according to another embodiment of the invention.

Furthermore, FIG. 3 shows the flow chart of a signal receiving method according to one embodiment of the invention. FIG. 4 shows the flow chart of a signal receiving method according to another embodiment of the invention. Since the relevant steps were already described in the above-mentioned paragraphs, it is believed that those who are skilled in the art should be able to understand easily. Thus, no further details will be given.

Therefore, the sink devices 10 and 10' according to embodiments of the invention save more power in comparison with the circuits according to the prior art, spare the originally required externally coupled clock generator, and also spare two pins of the chip originally required for coupling to the external clock generator. Therefore, the chip can be packaged with smaller size so that the chip can be more applicable to the mobile or handheld system application. Reducing production cost and reducing product size can be achieved.

Although the description of the invention is by way of above-mentioned examples of embodiment, however, it should not be construed as any limitation on the scope of the invention; various modifications or changes can be performed by those who are skilled in the art without deviating from the scope of the invention.

What is claimed is:

1. An apparatus, applicable to a wireless local area network, for receiving a first beacon signal and a second beacon signal from a source device, where the first beacon signal comprises a first time stamp and the second beacon signal comprises a second time stamp, the apparatus comprising:
   a receiving circuit configuring to enter a normal mode or a power-saving mode according to a beacon output signal and to receive the first beacon signal and the second beacon signal when the receiving circuit operates in the normal mode;
   a computing circuit, coupled to the receiving circuit, for computing a time interval between the first beacon signal and the second beacon signal to obtain a first value and for computing a difference between the first time stamp and the second time stamp to obtain a second value; and
   an adjusting circuit, coupled to the computing circuit, for adjusting the beacon output signal according to the first and the second values;
   wherein the apparatus substantially synchronizes with the source device according to the beacon output signal.

2. The apparatus according to claim 1, wherein the computing circuit comprises:
   a build-in clock generator for generating a clock signal;
   a first counter for using the clock signal to count the time interval between the first and the second beacon signals to obtain the first value; and
   a computing unit for computing the difference between the first time stamp and the second time stamp to obtain the second value.

3. The apparatus according to claim 2, wherein the clock signal is influenced by at least one environment factor.

4. The apparatus according to claim 1, wherein the adjusting circuit comprises:
   a determining unit for generating a parameter according to the first and the second values and comparing the parameter with a target beacon interval value to generate a comparison result; and
   a first clock generator for receiving the comparison result and adjusting the beacon output signal according to the comparison result.

5. The apparatus according to claim 1, wherein the beacon output signal is generated during the power-saving mode.

6. The apparatus according to claim 5, wherein the apparatus wakes up when the beacon output signal is enabled and a timing of enabling the beacon output signal is earlier than the timing of inputting the first beacon signal by a pre-determined time.

7. The apparatus according to claim 2, further comprising:
   a second counter for counting a reference clock signal during a calibrating mode to generate a third value and providing the third value for calibrating the build-in clock generator.

8. The apparatus according to claim 1, wherein the apparatus is a wireless station (STA).

9. The apparatus according to claim 1, wherein the adjusting circuit adjusts the beacon output signal according to fine adjustment information between the first and the second beacon signals.

10. The apparatus according to claim 1, wherein the adjusting circuit performs a mathematical algorithm to determine an adjustment amount according to the first and the second values.

11. The apparatus according to claim 10, wherein the mathematical algorithm comprises one of least mean square (LMS), linear regression, and moving average algorithms.

12. A signal receiving method, applicable to a wireless local area network and the wireless local area network comprising a sink device and a source device, the method comprising:
  receiving a first beacon signal and a second beacon signal from the source device, wherein the first beacon signal comprises a first time stamp and the second beacon signal comprises a second time stamp;
  computing a time interval between the first and second beacon signals to obtain a first value;
  computing a difference between the first and second time stamps to obtain a second value; and
  adjusting a beacon output signal according to the first and the second values.

13. The method according to claim 12, wherein the sink device synchronizes with the source device according to the beacon output signal.

14. The method according to claim 12, wherein the sink device enters a normal mode or a power-saving mode according to the beacon output signal.

15. The method according to claim 12, wherein the method operates during a power-saving mode of the sink device of wireless local area network.

16. The method according to claim 12, wherein the step of obtain the first value comprises:
  generating a clock signal, wherein the clock signal is influenced by at least one environment factor; and
  using the clock signal to count the time interval between the first and the second beacon signals to obtain the first value.

17. The method according to claim 16, further comprising:
  counting a reference clock signal to generate a third value in a calibrating mode; and
  calibrating the clock signal according to the third value in the calibrating mode.

18. The method according to claim 12, wherein the step of adjusting the beacon output signal comprises:
  generating a parameter according to the first and the second values;
  comparing the parameter with a target beacon interval value to generate a comparison result; and
  adjusting the beacon output signal according to the comparison result.

19. The method according to claim 12, wherein the beacon output signal is generated during a power-saving mode.

20. The method according to claim 12, wherein the step of adjusting the beacon output signal comprises:
  performing a mathematical algorithm to determine an adjustment amount according to the first and the second values; and
  adjusting the beacon output signal according to the adjustment amount.

* * * * *